M. M. McINTYRE.
VEHICLE SPRING.
APPLICATION FILED APR. 1, 1914.
1,155,752.
Patented Oct. 5, 1915.
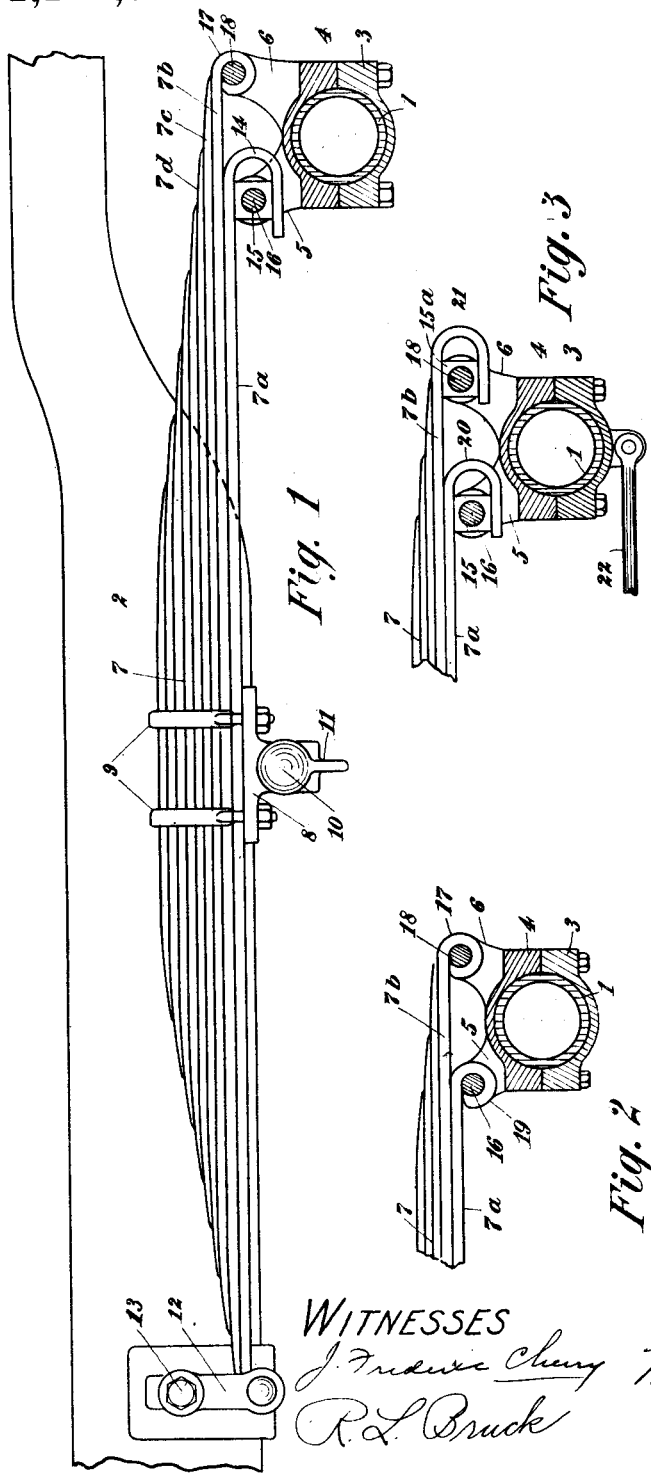
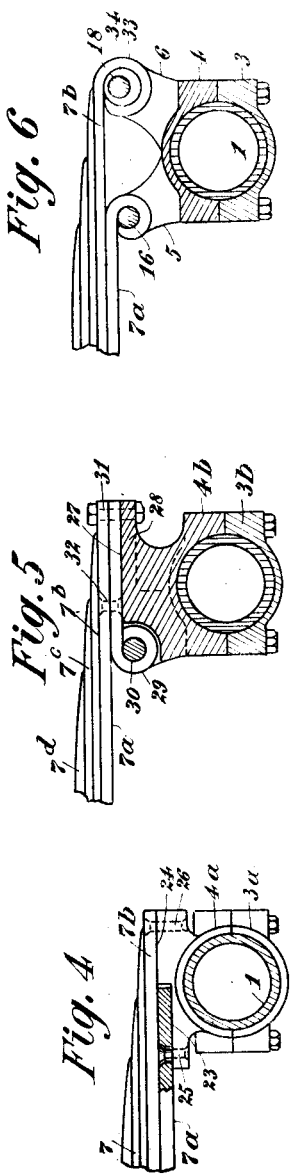
WITNESSES
J. Frederic Cherry
R. L. Bruck
INVENTOR
Michael M. McIntyre
By Hull & Smith
ATTYS.

UNITED STATES PATENT OFFICE.

MICHAEL M. McINTYRE, OF CLEVELAND, OHIO, ASSIGNOR TO THE PERFECTION SPRING COMPANY, OF CLEVELAND, OHIO, A CORPORATION OF OHIO.

VEHICLE-SPRING.

1,155,752.

Specification of Letters Patent.

Patented Oct. 5, 1915.

Application filed April 1, 1914. Serial No. 828,694.

*To all whom it may concern:*

Be it known that I, MICHAEL M. MCINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs and more particularly to springs of the cantaliver type having one end connected to the axle of a vehicle and being pivotally connected at the middle portion to the frame, the opposite end of the spring being generally connected to the vehicle frame by a swinging link.

It is the general object of the invention to improve the connection between springs of this type and the axle and more particularly to provide a connection (and especially a driving connection) which will be more efficient and less liable to break than is the case with the connections usually employed for this purpose.

With the foregoing objects in view, the invention may be defined further as consisting of the combinations of elements embodied in the claims hereto annexed and illustrated in the drawings accompanying and forming part hereof, wherein—

Figure 1 represents a side elevation of a spring constructed in accordance with my invention, part of the vehicle frame being shown in elevation and the axle being shown in section; while Figs. 2, 3, 4, 5 and 6 are sectional details illustrating modifications of the manner of connecting the end of the spring to the axle.

Heretofore it has been the general practice to connect the end of a cantaliver spring to the axle through a single leaf of the spring, the leaf employed being the main leaf or plate. When the spring is used as the driving connection between the axle and the vehicle frame, this throws the driving strain upon one leaf only. Furthermore, in order to provide means for securing this single leaf to the spring seat on the axle, it has been customary to make the main plate considerably longer than the plate next adjacent thereto, leaving the end of the main plate unreinforced. By the construction illustrated herein, it will be seen that I not only produce a better driving connection between the spring and the axle, but that I accomplish the result in such manner as not to interfere with the proper reinforcement of the end of the main plate.

Describing by reference characters the various parts illustrated herein, 1 denotes the axle and 2 the side frame of the body of a vehicle, such as an automobile.

3 and 4 denotes respectively the lower and upper members of a spring seat rotatably mounted upon the axle 1. The upper member is provided with two pairs of lugs 5 and 6 projecting upwardly therefrom and spaced apart longitudinally (that is in the direction of the length of the spring). Assuming that the axle 1 is the rear axle of the vehicle, the lugs 5 project forwardly and the lugs 6 rearwardly.

7 denotes generally the cantaliver spring and $7^a$ the main plate thereof and $7^b$ the plate or leaf next thereto. As is customary, the central portion of this spring is connected to a spring seat 8 by means of clips 9 and this spring seat is pivoted on a bolt 10 carried by a bracket 11 which is secured to the side frame 2. The front end of the spring (assuming that the spring is a rear spring) is connected to a pair of shackle links 12 depending from and pivotally supported by a bolt 13 projecting laterally from the side frame 2. The manner of supporting and connecting the middle of the spring and the front end thereof is that ordinarily employed. The rear end of the plate $7^a$ is bent into an open hook form, as shown at 14, the upper and lower branches of the hook being substantially parallel, whereby the hook is adapted to slide upon a block 15 mounted upon a pin 16 extending between the lugs 5. The rear end of the plate $7^b$ is formed with an eye 17 which embraces a pin 18 extending between the lugs 6. It will be observed that the lugs 5 and 6 are of such length and the pins 16 and 18 are so arranged that the vertical distance of the last mentioned pin from the center of the axle is greater by the thickness of the main plate $7^a$ than is the first mentioned pin, whereby these plates may be connected to their respective pins without disturbing the normal relation between the plates. It will be observed that, as is customary with springs of this type, the spring 7 is substantially straight, which will be its normal condition.

The driving connection between the axle and the spring is secured by the engagement of the plates 7ª and 7ᵇ with their respective pins 16 and 18. It will be observed that, by this mode of connecting the spring to the axle, the plate 7ᵇ above the main plate and the other plates 7ᶜ, 7ᵈ, etc., may be extended to their proper reinforcing positions without any interference or hindrance because of the manner of connecting the end of the spring with the axle. The sliding connection between the plate 7ª and the pin 16 compensates for the relative longitudinal movement or "creeping" between the leaves 7ª and 7ᵇ as the spring is deflected downwardly and upwardly.

In Fig. 2 there is shown a modification of the invention illustrated in Fig. 1 which differs from the invention of the earlier form in that the main plate 7ª is connected with the pin 16 by means of a closed eye 19, the connection being the same with the plate 7ᵇ as is the case with the like-designated plate of Fig. 1.

In Fig. 3 there is shown a modification of the invention wherein both plates 7ª and 7ᵇ are provided with the open eyes or hooks 20 and 21 slidably engaging blocks 15 and 15ª mounted on the pins 16 and 18. In this case, the axle will be connected to the frame by means of radius rods, one of the rods being indicated at 22.

In Fig. 4 there is shown a still further modification of the invention wherein the spring seat 3ª, 4ª on the axle, instead of being provided with two angularly extending arms, is provided with two individual seats, located respectively in the plane of the lower surface of the plate 7ª and in the plane of the lower surface of the plate 7ᵇ. The seat for the first mentioned plate is indicated at 23 and the seat for the second mentioned plate at 24. In this case, the plates 7ª and 7ᵇ are shown as connected to their respective seats by means of rivets 25 and 26 which are countersunk in the said plates, the opening 25ª for the rivet 25 being elongated to accommodate the creeping movement between the plates 7ª and 7ᵇ.

In Fig. 5 there is shown a still further modification of the invention wherein the spring seat 3ᵇ, 4ᵇ is connected to the main plate 7ª through a short reinforcing plate 27. This plate rests on the flat top 28 of the spring seat and has an eye 29 at its front end which is mounted on a pin 30 extending between the opposite sides of a recess in the front of the spring seat. The main plate 7ª is connected to the rear end of the spring seat by means of a bolt 31 which extends through the rear ends of the plates 7ª and 27 and the rear end of the spring seat. The main plate is also connected to the plate 27 by means of a rivet 32 which is shown as countersunk in both of said plates. This construction provides a reinforcement for the main plate whereby to assist the latter in its driving operation and at the same time permits of extending the rear ends of the spring plates 7ᵇ, 7ᶜ, etc., to proper reinforcing position above the rear ends of the lower plates.

In Fig. 6 there is shown a still further modification of the invention, wherein the spring seat 3, 4 is substantially identical with that shown in Fig. 1 but wherein the plate 7ª is connected to the pin 16 by a closed eye while the plate 7ᵇ is connected to the pin 18 by means of a closed eye 33 extending around a bushing 34 which is bored eccentrically for the reception of the pin 18. The advantage of the construction shown in this figure resides in the fact that both plates 7ª and 7ᵇ can be used for driving purposes while the eccentricity of the bushing automatically compensates for the creeping movement between the plate 7ª and 7ᵇ due to the upward and downward deflection of the spring.

Having thus described my invention, what I claim is:—

1. The combination, with a vehicle body frame and axle, of a spring comprising a main plate and one or more plates additional thereto, the plate adjacent to the main plate extending therebeyond, means pivotally connecting the central portion of said spring to the frame, and means connecting the end of the main plate and the end of the next adjacent plate to longitudinally spaced portions of the axle.

2. The combination, with a vehicle body frame and axle, of a spring comprising a main plate and one or more plates additional thereto, the main plate being shorter at one end than the next adjacent plate, means pivotally connecting the central portion of the spring to the frame, a spring seat rotatably mounted on the axle, and means connecting the end of the main plate and the end of the plate adjacent thereto to the spring seat.

3. The combination, with a vehicle body frame and axle, of a spring seat rotatably mounted on the axle and having a pair of longitudinally spaced connecting portions, one of said portions extending beyond the other, a spring comprising a main plate and one or more plates adjacent thereto, means pivotally connecting the central portion of the spring to the frame, and means connecting the end of the main plate and the end of the plate next adjacent thereto to the connecting portions of the spring seat.

4. The combination, with a vehicle body frame and axle, of a spring seat rotatably mounted on the axle and having a pair of longitudinally spaced connecting portions, one of said portions being at a greater distance from the axle than the other, a spring comprising a plurality of plates, means connecting the central or body portion of the spring to the frame, and means connecting the ends of two of the plates to the connecting portions of the spring seat.

5. The combination, with a vehicle body frame and axle, of a spring comprising a main plate and one or more plates additional thereto, means pivotally connecting the central or body portion of the spring to the frame, and means connecting two of the plates to the axle, one of such connections being a yielding connection.

6. The combination, with a vehicle body frame and axle, of a spring comprising a main plate and one or more plates additional thereto, means pivotally connecting the central or body portion of the spring to the frame, and means connecting the main plate and the plate adjacent thereto to the axle at longitudinally spaced points, one of such connections being a yielding connection.

7. The combination, with a vehicle body frame and axle, of a spring comprising a main plate and one or more plates additional thereto, means pivotally connecting the central portion of the spring to the frame, and means connecting the main plate and the plate adjacent thereto to the axle, the point of connection between the main plate and the axle being located nearer the center of the spring than the point of connection between the other plate and the axle, and said connections permitting a relative sliding movement between said plates.

8. The combination, with a vehicle body frame and axle, of a spring comprising a main plate and one or more plates additional thereto, means pivotally connecting the central portion of the spring to the frame, a spring seat upon the axle, and means connecting the main plate to said seat, the plate adjacent to the main plate extending beyond the point of connection of the spring seat and the main plate and reinforcing the latter at such point.

9. The combination, with a vehicle body frame and axle, of a spring comprising a main plate and one or more plates additional thereto, means pivotally connecting the central portion of the spring to the frame, means connecting the main plate to the axle, the plate adjacent to the main plate extending beyond the point of connection of the main plate and axle and reinforcing the main plate at such point, and means connecting the end of the last mentioned plate to the axle.

10. The combination, with a vehicle body frame and axle, of a spring having its central portion pivotally connected to the frame, said spring comprising a main plate and one or more plates additional thereto, the main plate being shorter than the plate next adjacent thereto, a spring seat rotatably mounted on the axle and having two longitudinally spaced connecting portions coöperating respectively with the end of the main plate and the end of the plate adjacent thereto, and means connecting said plates to the spring seat.

11. The combination, with a vehicle body frame and axle, of a spring, means pivotally connecting the central portion of the spring to the frame, a spring seat rotatably mounted upon the axle, said spring seat comprising two connecting portions which are spaced in the direction of the length of the spring, the connecting portion which is nearer the center of the spring projecting a shorter distance from the center of the axle than the other, means connecting the main plate of the spring with such shorter projecting portion of the spring seat, and means connecting the leaf adjacent to the main plate to the other portion of said seat.

12. The combination, with a vehicle body frame and axle, of a spring, means pivotally connecting the central portion of the spring to the frame, a spring seat rotatably mounted upon the axle and having two connecting portions spaced apart in the direction of the length of the spring, and means connecting the main plate and the plate adjacent thereto to said connecting portions, the connection between one of said plates and the spring seat including a pin and a bushing eccentrically mounted on the pin and passing through an eye in said plate.

13. The combination, with a vehicle body frame and axle, of a spring, means pivotally connecting the central portion of the spring to the frame, a spring seat rotatably mounted upon the axle and having two connecting portions spaced apart in the direction of the length of the spring, one of said connecting portions extending beyond the other, means connecting the main plate to the shorter projecting portion and means connecting the plate adjacent to the main plate to the other connecting portions, the connection between the last-mentioned plate and the spring seat including a pin and a bushing eccentrically mounted on the pin and passing through an eye in said plate.

14. The combination with an axle member and a vehicle body member, of a spring, means connecting the central or body portion of the spring to one of said members, and means connecting two of the plates to the other member at points longitudinally spaced, one of such connections being a yielding connection.

15. The combination, with a vehicle body frame and axle, of a spring, means pivotally connecting the central or body portion of said spring to the frame, a yielding connection between one end of the spring and the frame, a rotary spring seat on the axle, and means connecting longitudinally spaced portions of the other end of the spring to said seat.

16. The combination, with a vehicle body frame and axle, of a spring having its central or body portion pivotally connected to the frame, a spring seat rotatably mounted on the axle and having two longitudinally spaced connecting portions, means connecting correspondingly spaced portions of one end of the spring to such connecting portions of the seat, and connections between the opposite end of the spring and the frame.

17. The combination, with a vehicle body frame and axle, of a spring comprising a main plate and one or more plates additional thereto, means pivotally connecting the central or body portion of the spring to the frame, means yieldingly connecting one end of the spring to the frame, a spring seat rotatably mounted on the axle and having longitudinally spaced connecting portions, means connecting the main plate to one of said connecting portions, the plate adjacent to the main plate extending beyond the end of the main plate and reinforcing the same, and means connecting the end of the last mentioned plate to the other connecting portion of the spring seat.

18. The combination, with a vehicle body frame and axle, of a spring comprising a main plate and one or more auxiliary plates, means pivotally connecting the central or body portion of the spring to the frame, a spring seat rotatably mounted on the axle, means connecting the end of the main plate and the end of the plate adjacent thereto to longitudinally spaced portions of the spring seat, one of such connections being a longitudinally yielding connection, and means connecting the opposite end of the spring to the frame.

19. The combination, with a vehicle body frame and axle, of a spring comprising a main plate and one or more auxiliary plates, means pivotally connecting the central or body portion of the spring to the frame, a spring seat rotatably mounted on the axle, means connecting the end of the main plate and the end of an auxiliary plate to longitudinally spaced portions of the spring seat, one of such connections being a longitudinally yielding connection, and means connecting the opposite end of the spring to the frame.

In testimony whereof, I hereunto affix my signature in the presence of two witnesses.

MICHAEL M. McINTYRE.

Witnesses:
J. B. HULL,
BRENNAN B. WEST.